United States Patent
Tentarelli

[15] 3,668,510
[45] June 6, 1972

[54] THERMISTOR CONTROL CIRCUIT

[72] Inventor: Kenneth D. Tentarelli, Atkinson, N.H.

[73] Assignee: Bell Telephone Laboratories, Incorporated, Murray Hill, Berkeley Heights, N.J.

[22] Filed: Jan. 19, 1970

[21] Appl. No.: 3,989

[52] U.S. Cl.....................................................323/8, 323/68
[51] Int. Cl. ............................................................G05f 1/10
[58] Field of Search......................323/68, 69, 21, 8; 338/23, 338/24; 307/310, 311

[56] References Cited

UNITED STATES PATENTS

| | | | |
|---|---|---|---|
| 3,462,615 | 8/1969 | Bernstein | 307/311 X |
| 3,479,559 | 11/1969 | Paget | 323/21 UX |
| 3,441,892 | 4/1969 | Luedeman | 338/23 |
| 3,466,572 | 9/1969 | Hanna et al. | 323/21 UX |

OTHER PUBLICATIONS

IBM Technical Disclosure Bulletin "Multichannel Constant Current Supply" Vol. 11, No. 2, page 110, 7–68.

*Primary Examiner*—Rodney D. Bennett, Jr.
*Assistant Examiner*—R. Kinberg
*Attorney*—R. J. Guenther and E. W. Adams, Jr.

[57] ABSTRACT

An indirectly heated thermistor control circuit wherein a constant current source is connected with the bead resistance of the thermistor to provide a reference voltage proportional to variations in bead resistance. The reference voltage is connected by a feedback path to the non-inverting input of a differential amplifier where it is combined with the input command voltage which is applied to the inverting input of the differential amplifier. The output signal from the differential amplifier provides the thermistor heater current and is proportional to the difference between the reference voltage and command voltage.

6 Claims, 2 Drawing Figures

PATENTED JUN 6 1972

3,668,510

TO OTHER
CONTROL UNITS

TO OTHER
CONTROL UNITS

INVENTOR
K. D. TENTARELLI
BY John P. McDonnell

ATTORNEY 3,668,510

THERMISTOR CONTROL CIRCUIT

BACKGROUND OF THE INVENTION

This invention relates to control circuits and, more particularly, to control circuits which employ an indirectly heated thermistor or an equivalent semiconductor device as the control element.

Since the discovery of the variable resistance properties of certain semiconductor material, indirectly heated thermistors, i.e., thermistors which have a heater element, have been used as control elements. Although the use of thermistors is widespread, certain inherent deficiencies of indirectly heated thermistors have plagued circuit designers. These deficiencies include the errors introduced by the non-linear dependence of thermistor bead resistance on heater current and the relatively large manufacturing tolerances of thermistors. Since the heater current is usually controlled so as to affect the bead resistance and thereby introduce the desired control, the non-linear dependence of thermistor bead resistance on heater current makes it extremely difficult to obtain precise tracking in open loop regulating repeaters and equalizers, hereinafter referred to as regulators, employed in modern telephone systems. Similarly, typical thermistor manufacturing tolerances are intolerable in precision open loop regulators without compensatory circuit adjustment, and tend to reduce the available dynamic range in closed-loop regulators. Tighter manufacturing tolerances help overcome this latter deficiency but aging can cause several percent bead resistance shift over the first few years of use of the thermistor.

Other deficiencies which introduce difficulties in the use of indirectly heated thermistors in control circuitry are environment temperature sensitivity and high frequency heating. Since control of an indirectly heated thermistor is effected thermally, changes in bead resistance due to environment temperature rather than heater current results in system error in open loop regulators and loss of dynamic range in closed-loop regulators. In prior art circuits, thermistors are often placed in constant temperature housings or ovens to avoid these effects of environment temperature. High frequency signal currents vary with system levels and loading and have an effect on thermistor regulator performance similar to variations in ambient temperature.

In view of these deficiencies, a number of attempts have been made to replace indirectly heated thermistors in control circuits with relatively new devices including Hall-effect devices and optically coupled lamp-photocell packages, but none of these allow the performance demanded by the stringent systems requirements of modern telephone communication systems. Other attempts at using two matched thermistors in place of a single thermistor in an attempt to offset the aforenoted deficiencies have met with success only over a relatively limited dynamic operating range.

It is, therefore, an object of this invention to provide an indirectly heated thermistor control circuit which overcomes these aforenoted deficiencies.

It is a further object of the invention to provide an indirectly heated thermistor control circuit wherein the bead resistance of the indirectly heated thermistor is maintained proportional to the input command voltage.

SUMMARY OF THE INVENTION

In the present invention, a differential amplifier having an inverting and a non-inverting input is combined with a constant current source to control directly the bead resistance of an indirectly heated thermistor in accordance with a command signal. The command signal is connected to the inverting input of the differential amplifier with the output of the amplifier connected to the heating element of the indirectly heated thermistor. The bead resistance of the thermistor, which is connected to the output circuitry to be controlled, is also connected to a constant current source to establish a reference voltage which is proportional to the bead resistance. A feedback loop connects this reference voltage to the non-inverting input of the differential amplifier. Since the output current of the amplifier determines the heat generated by the thermistor heater element and this current is directly proportional to the difference between the bead resistance reference voltage and the command voltage, direct compensation is provided for variations in the bead resistance reference voltage. For example, if the bead resistance of the thermistor were to increase due to a decrease in environment temperature, then the reference voltage would increase by the same magnitude, the difference between the reference voltage and the command voltage would increase, and the heater current would increase, thereby characteristically decreasing the bead resistance and compensating for the initial increase. Each of the aforenoted deficiencies of indirectly heated thermistor circuits is compensated in a like manner as discussed in detail hereinafter. The bead resistance is thus directly proportional to the command voltage and substantially independent of all other parameters. As an added advantage, the present invention permits several thermistor control circuits to be driven from a single source of command voltage. Semiconductor devices which suffer from one or more of the deficiencies noted in connection with thermistors, e.g., field-effect transistors, may also be employed in the practice of the present invention, as discussed hereinafter.

BRIEF DESCRIPTION OF THE DRAWING

Other objects and features of the present invention will be apparent from the following discussion and single sheet of drawing in which.

DETAILED DESCRIPTION

Figure 1:
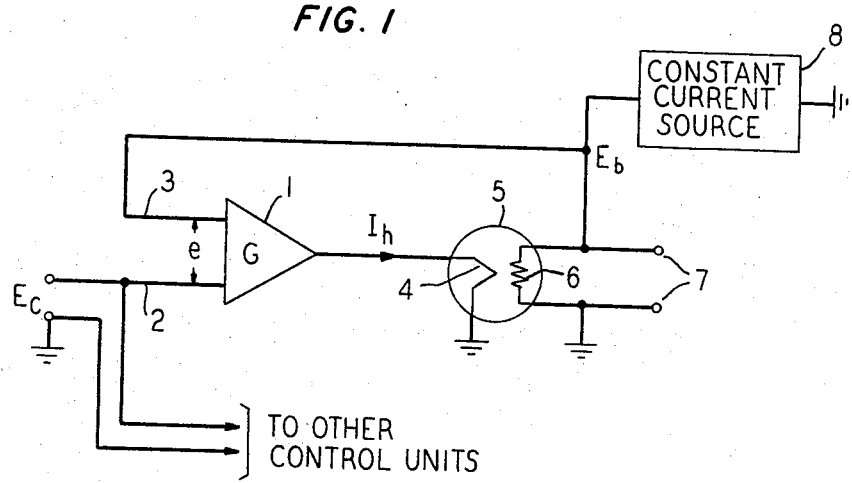
FIG. 1 is a simplified embodiment of the present invention.

As noted, FIG. 1 of the drawing is a simplified embodiment of the present invention. In the circuit of FIG. 1, amplifier 1 is a high gain transconductance amplifier having an inverting 2 and a non-inverting 3 differential inputs. The heating element 4 of the control thermistor 5 is connected between the output of the amplifier 1 and ground. The bead resistance 6 of thermistor 5 is connected to the output terminals 7 of the control network. A constant current source 8 is serially connected with the bead resistance 6 and ground. A feedback path is connected from the junction of the constant current source 8 and the bead resistance 6 to the non-inverting input to the amplifier 1. An input or command voltage is connected between ground and the inverting input 2 of the amplifier 1.

In the thermistor control circuit of FIG. 1, it is desired to vary the bead resistance 6 linearly with the command voltage $E_c$ appearing at the inverting input 2 of the amplifier 1. In other words, the output amplifier current $I_h$ should vary the bead resistance 6 of thermistor 5 linearly with changes in command voltage and independently of the deficiencies of indirectly heated thermistors noted heretofore. Circuitry responsive to the resistance of bead resistance 6 would be connected to the output terminals to be controlled directly by the command voltage $E_c$. For example, the present indirectly heated thermistor control circuit might be employed in a system having regulating repeaters and equalizers similar to those of the L4 Coaxial Carrier System disclosed in detail in the April 1969 issue of *The Bell System Technical Journal*. In such a system, the bead resistance of indirectly heated thermistors is used in some places to control the gain of amplifiers.

In the present invention, constant current source 8 provides a constant current reference used to generate a voltage $E_b$ which is directly proportional to the thermistor bead resistance $R_b$. The reference voltage appears in turn at the non-inverting input 3 of the amplifier 1 via the feedback path. The instantaneous input $e$ to the amplifier 1 may thus be treated as the difference between the reference voltage $E_b$ and the command voltage $E_c$. If the transconductance gain of the amplifier is symbolized as $G$, as shown in the drawing, the heater current $I_h$ of the output of the amplifier may be expressed as follows: $I_h = G(e) = G(E_b - E_c)$ for values of $e$ greater than zero. (The gain $G$ of the amplifier is chosen so that $I_h$ will be zero for values of $e$ less than zero.) Since the bead resistance of an indirectly heated thermistor is characteristically inversely proportional to the heater current $I_h$, variations in $E_b$ due to deficiencies in the thermistor cause the voltage $e$ to vary in a manner which varies $I_h$ and compensates for the thermistor variations or deficiencies. For example, if the resistance of the bead resistance 6 were to increase due to a decrease in the environmental temperature, the reference voltage $E_b$ would increase by the same magnitude, the current output from the constant current source being constant. From the foregoing expression for the heater current $I_h$, it is seen that $I_h$ would proportionally increase thereby increasing the temperature of the heater 4 and decreasing the resistance of the bead resistance 6. The initial variation of increased bead resistance 6 is thus compensated and the bead resistance 6 is thereby proportional to the command voltage $E_c$. Variations in bead resistance due to high frequency heating and manufacturing tolerances are compensated for in a similar manner. Since with the present invention bead resistance is a directly controlled variable, the non-linearity of heater current vs. bead resistance has no affect on circuit response. Each of the noted deficiencies of indirectly heated thermistor control circuits is thus overcome by the present invention. Since the bead resistance is inversely related to the heater current the feedback loop may be characterized as a negative feedback loop.

A still further advantage of the present invention is that the isolation and high gain presented by the amplifier 1 enables other similar indirectly heated thermistor control units to be driven by the same command voltage. Precise, identical control of multiple thermistor units is thus possible.

Figure 2:
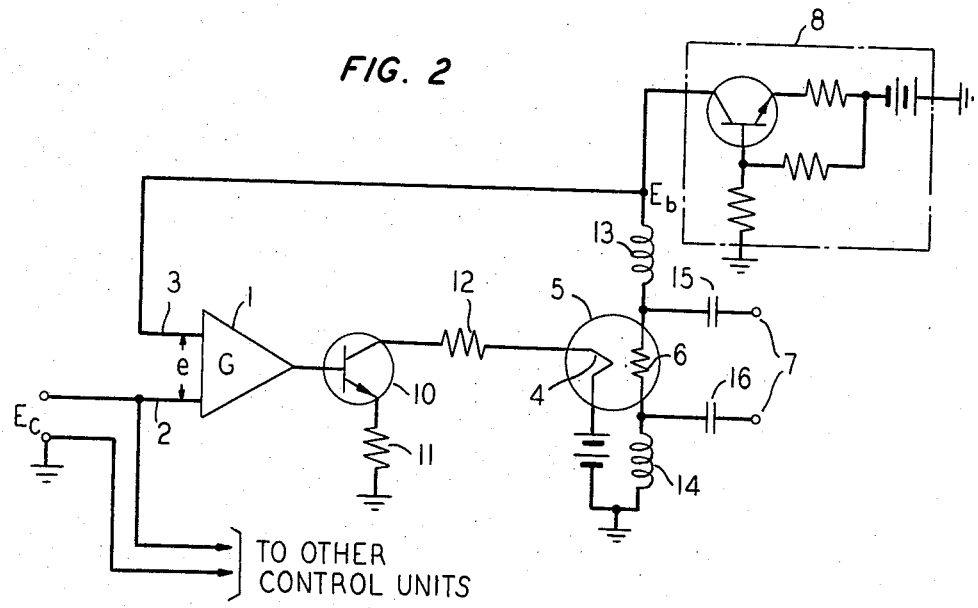
FIG. 2 illustrates a schematic embodiment of the present invention.

A more detailed embodiment of the present invention is illustrated in FIG. 2. In the circuit of FIG. 2, the components identified in FIG. 1 bear the same numerical designations. In FIG. 2, a transistor 10 has its base electrode connected to the output of the amplifier 1. The emitter electrode of transistor 10 is connected to ground through current limiting resistor 11. Resistor 12 connects the collector electrode of transistor 10 with the heater 4 of thermistor 5 and a source of biasing potential, symbolically represented as a battery, which is also connected to ground. An inductor 13 is serially connected with the bead resistance 6 of thermistor 5, inductor 14, constant current source 8, and ground. The constant current source 8 is schematically represented as a conventional one-transistor regulator with a source of constant biasing potential. Capacitor 15 is connected from the junction of inductor 13 and bead resistance 6 to one of the output terminals 7, while capacitor 16 is connected from the junction of inductor 14 and bead resistance 6 to the other output terminal 7.

Transistor 10 serves as a driver stage and enables the differential amplifier 1, which has a relatively high gain, to be fabricated using integrated circuit techniques. Inductors 13 and 14 serve as RF chokes which block high frequency signals from equipments connected to the output terminals 7 from interfering with the operation of the circuit of FIG. 2. Similarly, capacitors 15 and 16 serve as DC blocking capacitors. The operation of the circuit of FIG. 2 is the same as that of the circuit of FIG. 1 with the gain of transistor 10 determined by the required heater current of thermistor 5.

Although the foregoing discussion is directed primarily to a particular semiconductor device, the thermistor, it should be obvious that other semiconductor devices which suffer from one or more of the deficiencies noted heretofore in connection with thermistors, could also be employed in the practice of the present invention. For example, over the portion of their characteristic that they are employed as variable resistors, field-effect transistors exhibit a non-linear characteristic similar to that of thermistors. In the circuit of FIG. 1, the source electrode of the field-effect transistor would be connected to ground, the gate electrode would be connected to the output of the amplifier 1, and the drain electrode would be connected to the constant current source 8 and the feedback path to the input 3 of amplifier 1. Compensation for the non-linearity would then be provided in the manner discussed heretofore.

The above-described arrangement is illustrative of the application of the principles of the invention. Other embodiments may be devised by those skilled in the art without departing from the spirit and scope thereof.

What is claimed is:

1. A control circuit comprising an amplifier having inverting and non-inverting inputs, a source of command voltage connected to said inverting input of said amplifier, a semiconductor device having input and output terminals, means connecting the output of said amplifier to the input terminals of said semiconductor device to control the impedance presented by the output terminals of said semiconductor device in accordance with said command voltage, an output circuit to be controlled in accordance with the impedance presented at the output terminals of said semiconductor device connected to the output terminals of said semiconductor device, a constant current source serially connected with the output terminals of said semiconductor device to provide a reference voltage proportional to the impedance presented at the output terminals of said semiconductor device, and feedback means connecting said reference voltage from the output terminals of said semiconductor device to the non-inverting input of said amplifier, said output circuit and said reference feedback voltage being thereby controlled in accordance with the single impedance presented at the output terminals of said semiconductor device.

2. An indirectly heated thermistor control circuit comprising an amplifier having inverting and non-inverting inputs, a source of command voltage connected to said inverting input of said amplifier, an indirectly heated thermistor having its heater connected to the output of said amplifier, the bead resistance of said thermistor being connected to an output circuit which is controlled in accordance with said bead resistance, a constant current source serially connected with said bead resistance of said thermistor to provide a reference voltage across said bead resistance which is proportional to said bead resistance, and feedback means connecting said reference voltage from said bead resistance to the non-inverting input to said amplifier to supply said reference voltage to said amplifier, said output circuit and said reference voltage being both controlled in accordance with said single bead resistance.

3. An indirectly heated thermistor control circuit comprising an amplifier having inverting and non-inverting inputs, a source of input command voltage connected to said inverting input of said amplifier, a driving transistor having its base electrode connected to the output of said amplifier, the emitter and collector electrodes of said driving transistor being connected with the heater of an indirectly heated thermistor and a source of biasing potential, the bead resistance of said indirectly heated thermistor being connected to an output circuit which is controlled in accordance with said bead resistance, a constant current source serially connected with said bead resistance of said thermistor to provide a reference voltage across said bead resistance which is proportional to said bead resistance, and feedback means connecting said reference voltage from said bead resistance to the non-inverting input to said amplifier to supply said reference voltage to said amplifier, said output circuit and said reference voltage being both controlled in accordance with said single bead resistance, whereby the thermistor bead resistance is maintained directly proportional to the said input command voltage and is independent of thermistor deficiencies.

4. An indirectly heated thermistor control circuit in accordance with claim 3 wherein said amplifier circuit is an integrated circuit.

5. An indirectly heated thermistor control circuit in accordance with claim 3 wherein a first inductor is connected between one terminal of said bead resistance and one terminal of said constant current source, and a second inductor is serially connected between the other terminal of said bead resistance and the other terminal of said constant current source.

6. An indirectly heated thermistor control circuit in accordance with claim 5 wherein a first capacitor is connected between said one terminal of said bead resistance and one terminal of said load circuit, and a second capacitor is connected between said other terminal of said bead resistance and the other terminal of said output circuit.

* * * * *